United States Patent Office 3,336,851
Patented Aug. 22, 1967

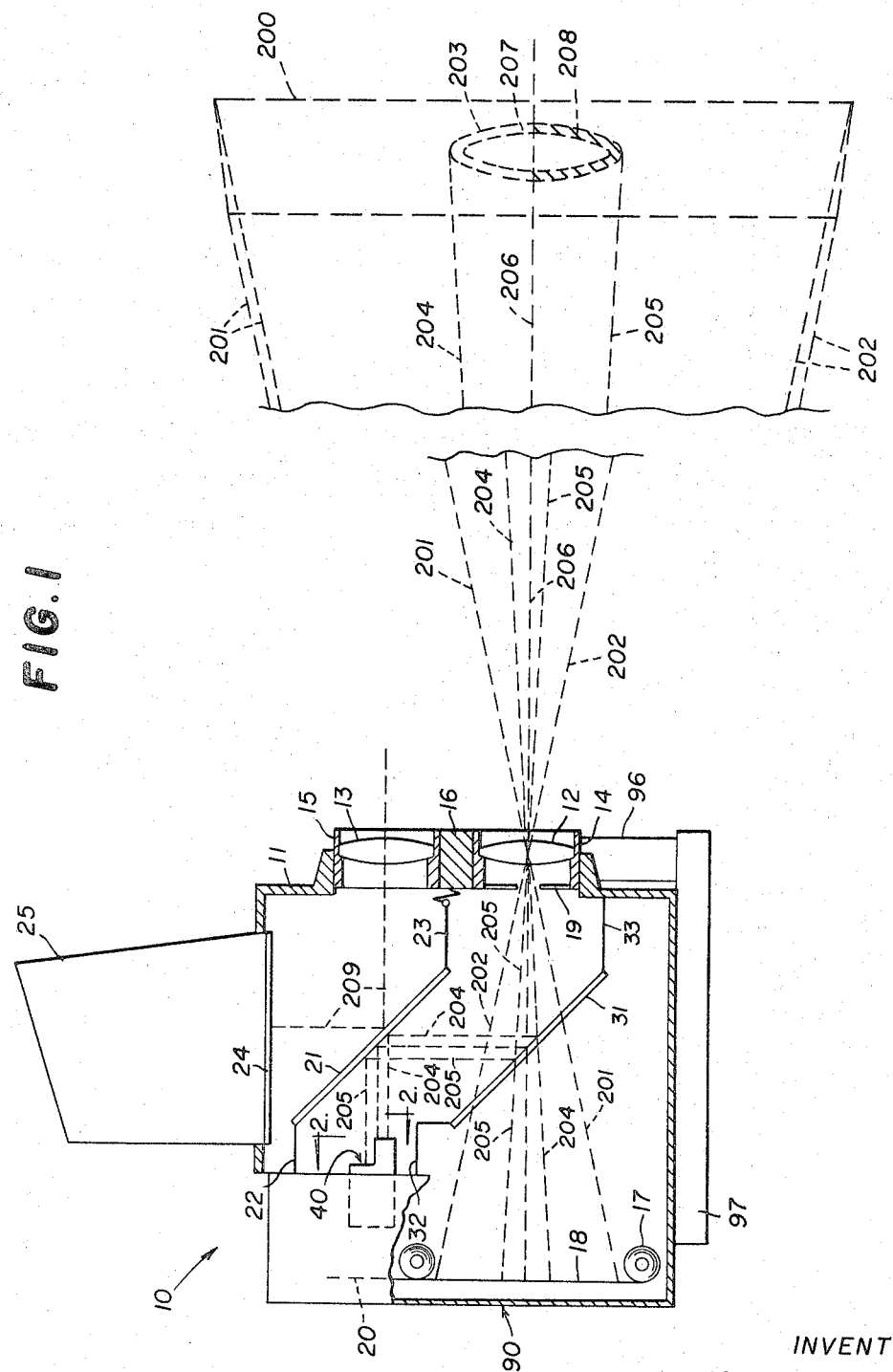

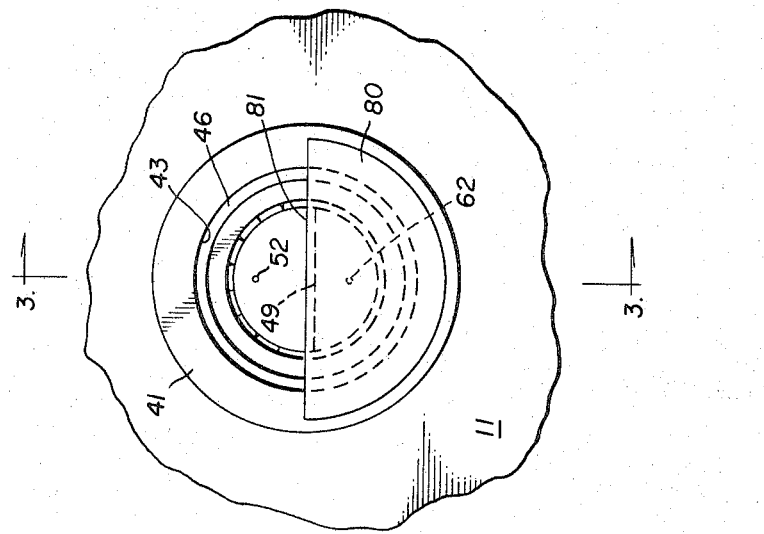
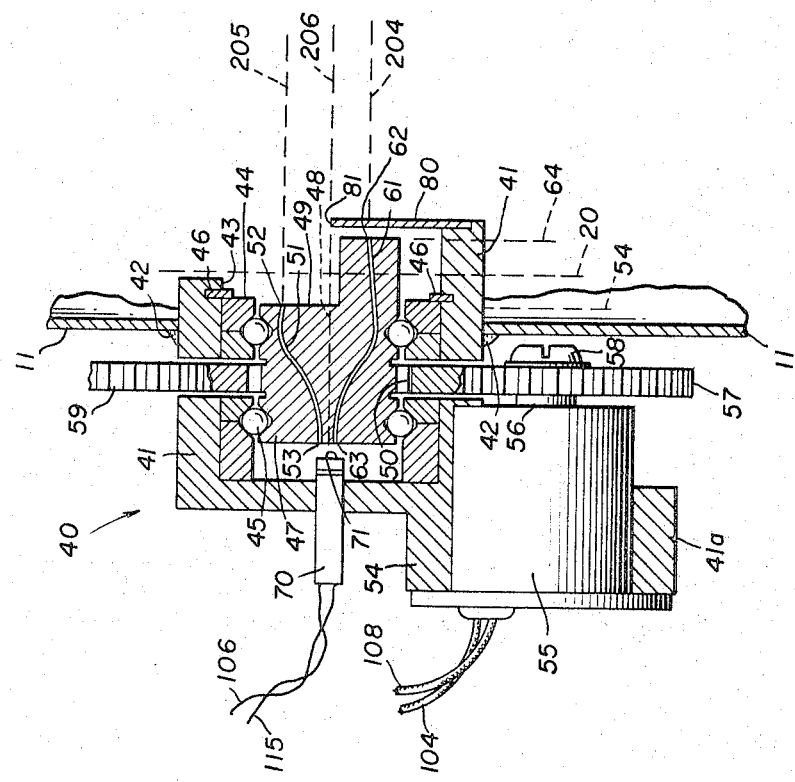

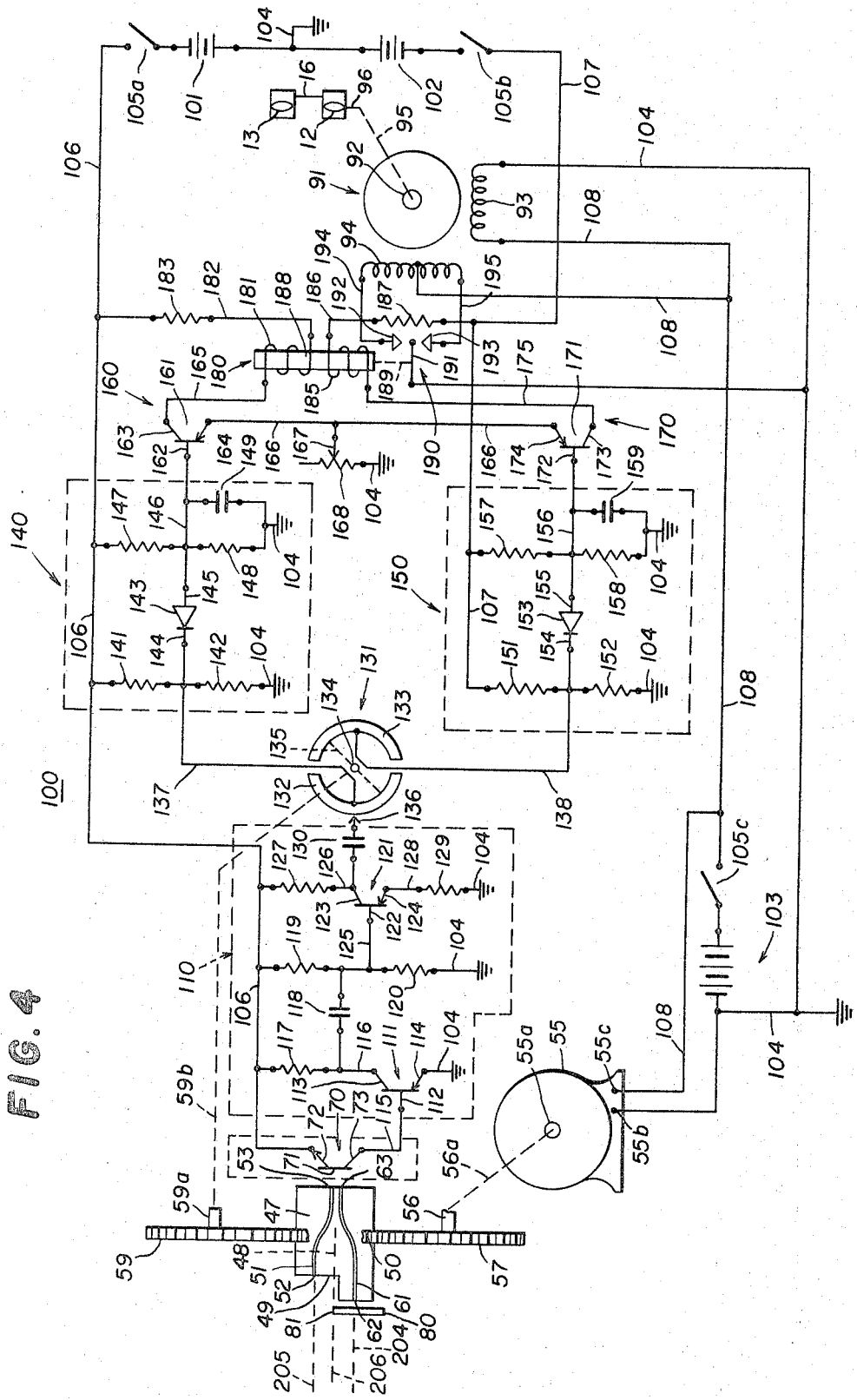

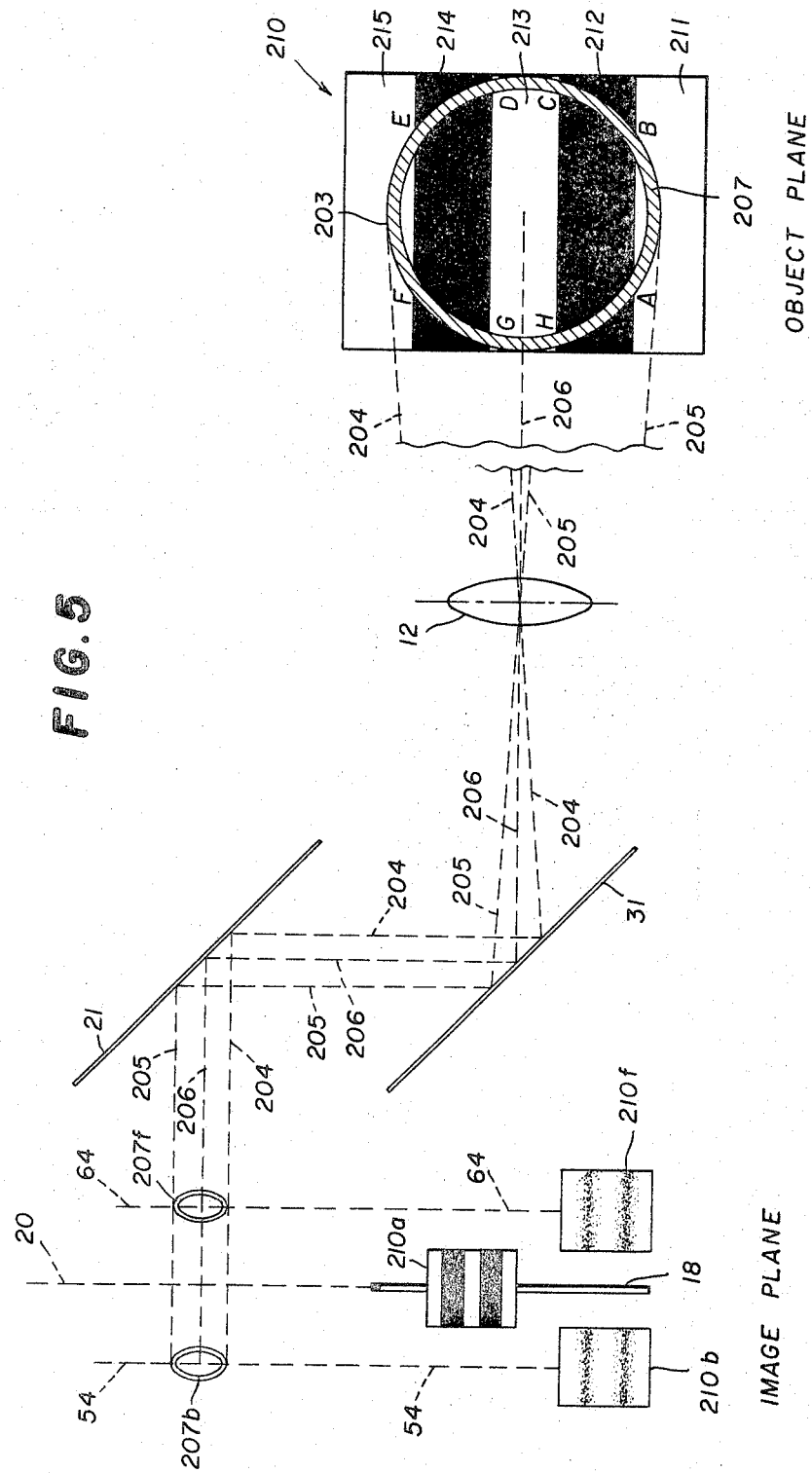

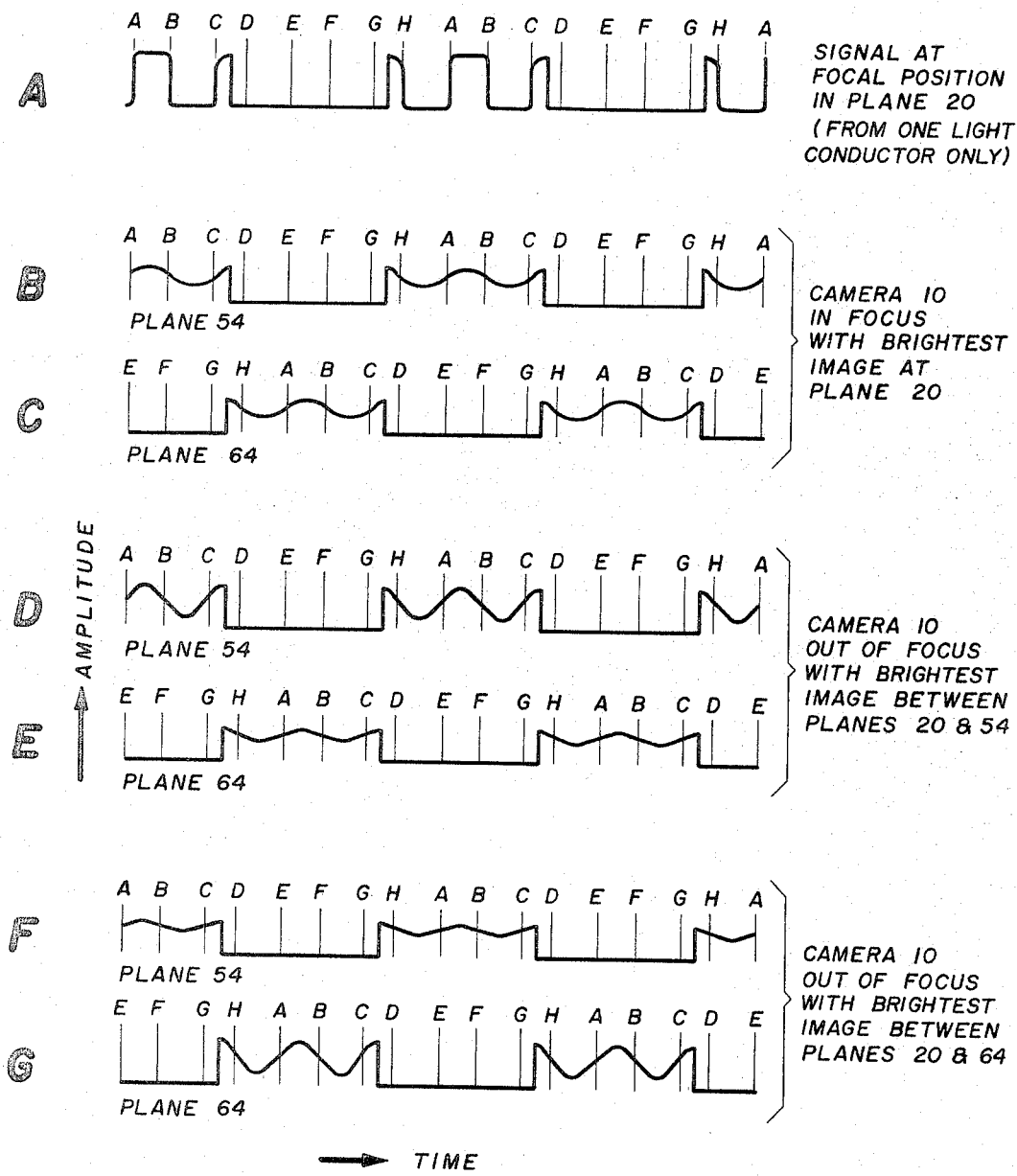

3,336,851
AUTOMATIC FOCUSING APPARATUS AND METHOD
Jay Warshawsky, Wilmette, Ill., assignor to General American Transportation Corporation, Chicago, Ill., a corporation of New York
Filed Mar. 1, 1965, Ser. No. 436,153
27 Claims. (Cl. 95—44)

ABSTRACT OF THE DISCLOSURE

There is disclosed a camera incorporating therein an automatic focusing apparatus and method for automatically focusing the camera upon an object in the field of view wherein the object has an area of contrast of light intensity thereat, the camera comprising a frame having a film holder thereon at a focal position and a lens assembly for directing an image in the field of view upon the focal position along the optical axis thereof, a first motor for moving the lens assembly toward and away from the film holder to change the focus, a photodetector mounted on the frame and operative upon receipt of light thereon to generate an electrical signal, first light and second conductors mounted on the frame and having inlets mounted for movement in predetermined paths in planes parallel to the focal position and disposed respectively at predetermined distances in front of and in back of the focal position and each having an outlet directed upon the photodetector, a second motor mounted on the frame for moving the inlets along the predetermined paths so that the first inlet scans an image of the object spaced a predetermined distance in front of the focal position and the second inlet scans an image of the object spaced a predetermined distance in back of the focal position and both along the same path and in the same area of contrast of light intensity, the photodetector generating a first modulated electrical signal having an amplitude of modulation proportional to the light received in the first inlet and a second modulated electrical signal having an amplitude of modulation proportional to the light received in the second inlet, a first detecting network mounted on the frame for generating a third electrical signal related to the first electrical signal, a second detecting network mounted on the frame for generating a fourth electrical signal related to the second electrical signal, a switch driven by the second motor for alternately connecting the output of the photodetector to the first detecting network to apply the first electrical signal thereto and then to the second detecting network to apply the second electrical signal thereto, and power means responsive to the difference between the third and fourth electrical signals for operating the first motor to move the lens assembly toward and away from the film holder to focus an image of the object at the focal position upon the film holder.

The present invention relates to automatic focusing apparatus and methods, and more particularly to such apparatus and methods wherein focusing is adjusted to achieve high image contrast, sharp focus corresponding to high image contrast.

It is a general object of the invention to provide an improved apparatus for automatically focusing an optical imaging system upon an object in a field of view wherein the object has an area of contrast of light intensity thereat, a parameter of the optical imaging system being changed to focus an image of the object at the focal position of the optical imaging system so that maximum contrast of light intensity about the object at the focal position is obtained.

Another object of the invention is to provide an improved apparatus for automatically focusing an optical imaging system upon an object in a field of view wherein the object has an area of contrast of light intensity thereat, the optical imaging system including a focal position and a lens assembly for directing an image of the field of view upon the focal position along the optical axis thereof, and motor means for changing a parameter of the optical imaging system to change the focusing thereof, means for generating a first electrical signal related to the light received in scanning an image of the object spaced a predetermined distance in front of the focal position and in the area of contrast of light intensity, means for generating a second electrical signal related to the light received in scanning an image of the object spaced the same predetermined distance in back of the focal position and in the same area of contrast of light intensity, and power means responsive to the difference between the first and second electrical signals operating the motor means to change a parameter of the optical imaging system to focus an image of the object at the focal position.

In connection with the foregoing object, it is another object of the invention to provide an automatic focusing apparatus of the type set forth wherein the motor means changes the distance between the focal position and the lens assembly.

Another object of the invention is to provide an improved automatic focusing apparatus of the type set forth wherein only a small portion of the total field of view of the optical imaging system is scanned so as to eliminate the ambiguities which might arise when the total field of view contains objects at different distances from the apparatus.

In connection with the foregoing object, it is another object of the invention to provide an improved automatic focusing apparatus of the type set forth wherein the portion of the field of view scanned is disposed centrally thereof and constitutes from about 0.5% to about 10% of the total field of view.

Another object of the invention is to provide an improved automatic focusing apparatus of the type set forth wherein the images in front of and in back of the focal position are scanned and the light received is conducted to an electrical signal generating apparatus which generates the necessary control signals therefrom, the scanning mechanism preferably alternately scanning the image in front of the focal position and the image in back of the focal position.

Another object of the invention is to provide in an automatic focusing apparatus of the type set forth a single photodetector to which the light intercepted in scanning the images in front of and in back of the focal position are alternately applied by suitable light conducting structure so that the intensity of the signals developed by the photodetector depend only upon the intensity of the light in the images scanned.

A further object of the invention is to provide an improved automatic focusing apparatus of the type set forth wherein matched non-linear or detecting networks are provided, and the output from the photodetector is switched from one to the other so that one of the detecting networks produces an electrical signal having an amplitude proportional to the light intensity gradient of the image scanned in front of the focal position and the other of the detecting networks produces an electrical signal having an amplitude proportional to the light intensity gradient of the image scanned in front of the focal position.

A further object of the invention is to provide an improved automatic focusing apparatus of the type set forth which is essentially independent of the light intensity at and the geometry of the object in the field of view that is being scanned.

A further object of the invention is to provide an improved camera having incorporated therein the improved automatic focusing apparatus of the present invention.

A still further object of the invention is to provide improved methods of focusing an optical imaging system of the type set forth.

Further features of the invention pertain to the particular arrangement of the elements of the automatic focusing apparatus and of the steps of the automatic focusing methods, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a diagrammatic view in vertical section through a camera incorporating therein an automatic focusing apparatus embodying the present invention and operable in accordance with a method of the present invention, the relationship between the field of view and the paths of typical light rays through the camera being diagrammatically illustrated;

FIG. 2 is an enlarged fragmentary front elevational view of a portion of the automatic focusing apparatus as seen in the direction of the arrows along the line 2—2 in FIG. 1;

FIG. 3 is a view in vertical section along the line 3—3 in FIG. 2;

FIG. 4 is a schematic electrical diagram of the automatic focusing apparatus illustrated in FIGS. 1 to 3 of the drawings;

FIG. 5 is a diagrammatic view illustrating the light intensities encountered at various positions about the focal position of the automatic focusing apparatus; and FIG. 6 is a schematic drawing of the electrical signals appearing as outputs from the photodetector for various conditions of focus of an image with respect to the focal position in the automatic focusing apparatus.

Although the automatic focusing apparatus and methods of the present invention may be incorporated in a wide variety of optical imaging systems including still cameras, movie cameras, TV cameras, slide and movie projectors, range-finders, photo-enlargers, and photo-copiers, certain of the important advantages thereof are more fully realized when incorporated in a still camera, and there is illustrated in the drawings a twin-lens reflex camera 10 incorporating therein an automatic focusing apparatus embodying the present invention. The camera 10 includes the usual light-tight housing or frame 11 which is generally rectangular in vertical section as illustrated and in horizontal section as well. On the front of the housing 11 is mounted a pair of matched lenses 12 and 13 which are mounted in lens housing 14 and 15, respectively, and are interconnected as at 16 so that they move together inwardly and outwardly with respect to the housing 11 while supported by the lens housing 14 and 15, respectively. The lower lens 12 admits light into the lower portion of the housing 11 and directs it upon a focal position disposed to the rear of the housing 11 or to the left as viewed in FIG. 1, a film holder 17 being positioned adjacent to the focal position and being operative to hold a sheet of film 18 at the focal position, the focal position being essentially a plane 20 as illustrated in which the film 18 is disposed and held by the film holder 17. By moving the lens 12 inwardly and outwardly with respect to the housing 11, an image of an object can be focused upon the focal position, i.e., upon the plane 20 in which the film 18 is held. There further is provided a shutter mechanism diagrammatically illustrated at 19 which is used periodically to admit a predetermined amount of light into the housing 11 through the lens 12, all as is well known in the art.

A view finder is also provided, the lens 13 admitting light into the upper proportion of the housing 11, the light being directed upon a fixed mirror 21 which is held in position tilted at an angle of 45° to the optical axis of the lens 13 by a pair of brackets 22 and 23; the mirror 21 and the associated mounting structure also serve to divide the housing 11 into a lower light-tight compartment (with the exception of the light admitted through the lens 12 when the shutter mechanism 19 is open) and an upper compartment which is utilized for the view finding purpose. Specifically, the upper surface of the mirror 21 is formed reflecting in the usual manner and serves to reflect light admitted through the lens 13 upon a ground glass 24 which is mounted in the upper portion of the housing 11 and is provided with an upwardly extending hood 25 open at the upper end so that the camera user can look through the hood 25 and view the scene presented on the ground glass 24, the scene on the ground glass 24 received through the lens 13 being substantially the scene that is admitted through the lens 12 and strikes the film 18. The lens 13 also can provide information for achieving a manual focus adjustment, the light paths being so chosen that objects focused upon the ground glass 24 are likewise focused upon the film 18, the lenses 12 and 13 being linked together as at 16 to be moved as a unit during the focusing operation.

Recaptiulating, the camera 10 comprises a well known twin-lens reflex camera having an optical imaging system in the lower portion of the housing 11, which lower portion constitutes a light-tight compartment. The optical imaging system more particularly comprises a focal position, namely, the plane 20 occupied by the film 18, and the lens 12, it being understood that the lens 12 is preferably in fact an assembly of several lenses to provide for good optical properties of the resulting lens assembly. A view finder and a visual focus indicator provided in the upper portion of the housing 11 in the form of a lens 13 which has the image therefrom reflected from the fixed mirror 21 and formed upon the ground glass 24. The user of the camera looking through the upper end of the hood 25 can view the image upon the ground glass 24 to determine the field of view and can obtain a manual focusing thereof by moving the lenses 12 and 13 as a unit until the desired object is in focus upon the ground glass 24.

In accordance with the present invention, an automatic focusing apparatus is incorporated in the camera 10 to utilize a portion of the light transmitted through the lens 12 to determine the state of focus and to adjust through automatic mechanism the position of the lens 12, and consequently the position of the lens 13, with respect to the housing 11 so as to achieve a focus of a desired object in the field of view upon the focal position 20 occupied by the film 18. To this end a second fixed mirror 31 is provided in the lower compartment of the housing 11 and is held in a position tilted at an angle of 45° with respect to the optical axis of the lens 12 by means of a pair of brackets 32 and 33 mounted on the housing 11. One surface of the mirror 31 is partially silvered so that a portion of the light falling thereon is reflected upwardly toward the fixed mirror 21 while the remainder of the light passes therethrough and falls upon the film 18. Since both of the mirrors 21 and 31 are disposed at angles of 45° with respect to the parallel optical axes of the associated lenses 12 and 13, the mirrors 21 and 31 are also parallel to each other and the light reflected from the mirror 31 is directed upwardly and strikes the rear or lower surface of the mirror 21. The lower surface of the mirror 21 is also provided with a reflective surface and directs the light rearwardly along a path substantially parallel to the light entering through the lens 12 and directs the light upon a scanning mechanism generally designated by the numeral 40.

The details of construction of the scanning mechanism 40 are best illustrated in FIGS. 2 and 3 of the drawings wherein it will be seen that the scanning mechanism 40 is mounted upon the rear wall of the housing 11 and includes a generally annular housing 41 having a forwardly extending portion of substantially cylindrical configuration extending through a circular opening in the housing 11 and suitably secured thereto as by welding at 42. The housing 41 has a cylindrical recess 43 therein in which is positioned a ball bearing assembly 44 carrying a plurality of anti-friction balls 45, the assembly 44 being held in place by a ring 46 within the recess 43. The ball bearing assembly 44 supports a generally cylindrical support member 47 for rotation therein about an axis generally designated by the numeral 48, the axis 48 being along the optical axis of the lens 12 as reflected from the mirrors 21 and 31 for a purpose which will be explained more fully hereinafter.

The support member 47 carries a first light conductor 51 which is formed by a bundle of optical transmitting fibers or light ducts, the light conductor 51 having an inlet 52 disposed forwardly or to the right in FIG. 3 and an outlet 53 disposed rearwardly or to the left in FIG. 3. The inlet 52 is spaced radially outwardly from the axis of rotation 48 a first predetermined distance and is disposed rearwardly with respect to the focal position 20 a second predetermined distance, and as a consequence, the inlet 52 is moved in a circular path upon rotation of the support member 47, the circular path lying in a plane 54 parallel to the plane of the focal position 20, but spaced rearwardly therefrom a second predetermined distance. The outlet 53 of the light conductor 51 is positioned only a short distance radially outwardly from the axis of rotation 48 for a purpose which will be explained more fully hereinafter. For proper operation, the end faces of the various optical fibers or light ducts at the inlet 52 must be substantially normal to the incoming rays of light to have maximum efficiency of light transmission thereby.

The support member 47 also carries a second light conductor 61 which is also formed by a bundle of optical transmitting fibers or light ducts, the light conductor 61 having an inlet 62 disposed forwardly or to the right in FIG. 3 in a recess 49 in the support member 47, and an outlet 63 disposed rearwardly or to the left in FIG. 3. The inlet 62 is spaced radially outwardly from the axis of rotation 48 the same distance as the inlet 52 and is disposed forwardly with respect to the focal position 20 the same predetermined distance that the first inlet 52 is disposed rearwardly thereof, and as a consequence, the inlet 62 is moved in a circular path upon rotation of the support member 47, the circular path lying in a plane 64 parallel to the plane of the focal position 20, but spaced forwardly therefrom the same predetermined distance that the plane described by the inlet 52 is spaced rearwardly from the focal position 20. The outlet 63 of the light conductor 61 is positioned only a short distance radially outwardly from the axis of rotation 48 for a purpose which will be explained more fully hereinafter. For proper operation, the end faces of the various optical fibers or light ducts at the inlet 62 must be substantially normal to the incoming rays of light to have maximum efficiency of light transmission thereby.

In order to provide motive power for rotating the support member 47, the housing 41 has a rearward projection 41a thereon in which is mounted an electrical motor 55, the electrical motor 55 including an internally mounted output shaft 55a (see FIG. 4 also) and a gear reduction train diagrammatically illustrated at 56a that drives an output shaft 56 extending forwardly therefrom. Mounted upon the output shaft 56 is a gear 57 held in position by a screw 58, the gear 57 engaging gear teeth 50 formed on the periphery of the support member 47, a suitable opening in the side of the housing 41 being provided to accommodate the gear 57 meshing with the gear teeth 50. Operation of the motor 55 serves to rotate the support member 47 about its axis of rotation 48 which rotation of the support member 47 causes the inlets 52 and 62 to be driven in circular paths of the same diameter symmetrically positioned about the axis of rotation 48 and disposed the same predetermined distance forwardly and rearwardly respectively of the focal position 20.

Also mounted upon the housing 41 and extending rearwardly therefrom is a photodetector 70 (see FIG. 4 also) including a light receiving surface 71 that is disposed immediately rearwardly of the support member 47 as illustrated in FIG. 3, the surface 71 having an area such that the light from the conductors 51 and 61 exiting therefrom at the outlets 53 and 63 is directed thereupon; more specifically, the longitudinal axis of the generally cylindrical photodetector 70 is in alignment with the axis of rotation 48. Accordingly, the light transmitted through the light conductors 51 and 61 is directed upon the light sensitive surface 71 of the photodetector 70. There likewise is mounted upon the housing 41 on the forward portion thereof adjacent to the front end of the support member 47 a light mask 80 which is generally semi-circular in configuration (see FIG. 2) and has an upper edge 81 that is straight and extends horizontally and contains on the surface thereof the axis of rotation 48, whereby the light input to the light conductors 51 and 61 is interrupted for half of each revolution of the support member 47, i.e., light is admitted to the inlets 52 and 62 for only that portion of each revolution during which the inlet is above the edge 81 of the housing 80. Finally, there is also provided a drive gear 59 that meshes with the gear teeth 50 on the support member 47 to transmit information with regard to the position of the support member 47 for a purpose which will be explained more fully hereinafter.

Referring to FIG. 4 of the drawings the electrical circuit 100 forming a part of the automatic focusing apparatus will be described. The electrical circuit 100 is powered by three batteries 101, 102 and 103. The positive terminals of the batteries 101 and 102 are connected to each other by a grounded conductor 104 and the negative terminal of the battery 103 is likewise grounded through the conductor 104. The negative terminals of the batteries 101 and 102 and the positive terminal of the battery 103 are all connected to sections of a main power switch 105, the batteries more specifically being connected respectively to the switch sections 105a, 105b and 105c, it being understood that the various switch sections 105a, 105b and 105c are ganged together so that a single actuator may be provided therefor. Upon closure of the switch section 105a a negative operating potential is applied to a conductor 106, upon closure of the switch section 105b a negative operating potential is applied to a conductor 107 and upon closure of the switch section 105c a positive operating potential is applied to a conductor 108. The power for the driving of the motor 55 is derived from the battery 103, the motor 55 having input terminals 55b and 55c that are connected respectively to the conductors 104 and 108. Consequently, upon the closure of the main power switch 105 with the resultant closure of the switch section 105c, the motor 55 is energized and will operate continuously to drive the support member 47 at a suitable rate, such as for example 60 revolutions per second, it being understood that substantially lower driving rates of the order of 20 revolutions per second may be utilized or even higher driving rates may be utilized.

The input to the electrical circuit 100 is a series of electrical signals from the photodetector 70, which signals are first amplified in an amplifying network 110. The output from the amplifying network 110 is connected alternately to one of two rectifying and filtering networks 140 and 150 by a switch 131, and the outputs from the rectifying networks 140 and 150 are amplified respectively by power amplifiers 160 and 170 that drive a power solenoid 180 that controls a power switch 190 that in turn controls the operation of a second drive motor 91 that is connected to the lens assembly 12 as will be described more fully hereinafter.

More particularly, the photodetector 70 has connected to the light sensitive surface 71 thereof two electrodes 72 and 73, the electrode 72 being connected to the negative power conductor 106 and the electrode 73 being connected to the first amplifying transistor 111 in the amplifying network 110. The transistor 111 includes a base 112, a collector 113 and an emitter 114, the transistor 111 as illustrated being of the p-n-p type. The base 112 is connected by a conductor 115 to the photodetector electrode 73, the collector 113 is connected by a conductor 116 to one terminal of a resistor 117 having the other terminal thereof connected to the power conductor 106, and the emitter 114 is grounded as at 104. The electrical signals from the photodetector 70 are impressed between the base 112 and the collector 113 and the resulting amplified and inverted signal on the conductor 116 is connected to one terminal of a coupling capacity 118, the other terminal of the coupling capacitor 118 being connected to the base of the second amplifying transistor 121 in the amplifying network 110. The transistor 121 is also of the p-n-p type and includes a base 122, a collector 123 and an emitter 124.

The base 122 is connected by the conductor 125 to the output terminal of the coupling capacitor 118, the conductor 125 being connected through a resistor 119 to the negative conductor 106 and being connected through a resistor 120 to the grounded conductor 104; the collector 123 is connected by a conductor 126 to one terminal of a resistor 127 having the other terminal thereof connected to the conductor 106 and the emitter 124 is connected by a conductor 128 to one terminal of the resistor 129 having the other terminal thereof grounded as at 104. The amplified and inverted signal from the transistor 122 is connected by the conductor 126 to one terminal of a coupling capacitor 130 which has the other terminal thereof connected to the switch 131.

As illustrated, the switch 131 is of the commutator type and includes a pair of semi-circular conducting segments 132 and 133 that are mounted upon but electrically insulated from a rotatable shaft 134 by structure diagrammatically illustrated at 135. The output from the amplifying network 110 on the capacitor 130 is applied to the switch 131 through a contact 136 connected to the output terminal of the capacitor 130, the contact 136 alternately being in electrical connection with the conductive segments 132 and 133 as the switch 131 is rotated upon its shaft 134. An output conductor 137 is in electrical communication with the conductive segment 132 and an output conductor 138 is in electrical communication with the conductive segment 133 at all times. The switch 131 is rotated by a drive mechanism diagrammatically illustrated at 59b connected to the shaft 134 and driven from a shaft 59a connected to the gear 59 (see FIG. 3 also). Through the drive train described, the position of the support member 47 is communicated to the switch 131 and the conductive segments 132 and 133 are associated respectively with the light conductors 51 and 61, i.e., the contact 136 is in electrical connection with the conductive segment 132 when the inlet 52 of the light conductor 51 is above the upper edge 81 of the mask 80, and the contact 136 is in electrical connection with the conductive segment 133 when the inlet 62 of the light conductor 61 is above the upper edge 81 of the mask 80. Accordingly, the switch 131 serves to connect the amplified electrical signals corresponding to the light conducted by the light conductor 51 through the conductor 137 to the input of the rectifying network 140, and the switch 131 serves to connect the amplified electrical signals corresponding to the light conducted by the light conductor 61 through the conductor 138 to the input of the rectifying network 150.

The rectifying network 140 includes a pair of resistors 141 and 142 having a common junction between one pair of terminals thereof connected to the conductor 137, the other terminal of the resistor 141 being connected to the conductor 106 and the other terminal of the resistor 142 being connected to the ground conductor 104. The conductor 137 is also connected to a rectifier 143 having an input terminal 144 connected to the conductor 137 and an output terminal 145 connected to a conductor 146. The conductor 146 is connected to one of the terminals of a resistor 147 having the other terminal thereof connected to the conductor 106 and to one terminal of a resistor 148 having the other terminal thereof connected to the grounded conductor 104. A capacitor 149 is also connected between the conductor 146 and the grounded conductor 104. The output from the rectifying network 140 is a rectified and filtered signal that appears on the conductor 146 and is applied as the input to the amplifier 160.

The rectifying network 150 includes a pair of resistors 151 and 152 having a common junction between one pair of terminals thereof connected to the conductor 138, the other terminal of the resistor 151 being connected to the conductor 107 and the other terminal of the resistor 152 being connected to the grounded conductor 104. The conductor 138 is also connected to a rectifier 153 having an input terminal 154 connected to the conductor 138 and an output terminal 155 connected to a conductor 156. The conductor 156 is connected to one of the terminals of a resistor 157 having the other terminal thereof connected to the conductor 107 and to one terminal of a resistor 158 having the other terminal thereof connected to the grounded conductor 104. A capacitor 159 is also connected between the conductor 156 and the grounded conductor 104. The output from the rectifying network 150 is a rectified and filtered signal that appears on the conductor 156 and is applied as the input to the amplifier 170.

The amplifier 160 is also a transistor of the p-n-p type having a base 162, a collector 163 and an emitter 164. The base 162 is connected to the conductor 146 to receive the output from the rectifying network 140, the collector 163 is connected by a conductor 165 to the power relay 180 and the emitter 164 is connected by a conductor 166 to a movable contact 167 on a resistor 168, one terminal of the resistor 168 being connected to the grounded conductor 104. The amplifier 170 is also a transistor of the p-n-p type having a base 172, a collector 173 and an emitter 174. The base 172 is connected to the conductor 156 to receive the output from the rectifying network 150, the collector 173 is connected by a conductor 175 to the power relay 180 and the emitter 174 is connected by the conductor 166 also to movable contact 167 on the resistor 168.

The relay 180 is of the polarized differential type and has two coils 181 and 185 wound in opposite directions one to the other so that the relay 180 is responsive to the difference between the voltages developed in the coils 181 and 185. The drive for the coil 181 is obtained from the amplifier 160, one terminal of the coil 181 being connected to the conductor 165 and the other terminal of the coil 181 being connected through a conductor 182 to one terminal of a limiting resistor 183, the other terminal of the resistor 183 being connected to the power conductor 106. The drive for the coil 185 is obtained from the amplifier 170, one terminal of the coil 185 being connected to the conductor 175 and the other terminal of the coil 185 being connected through a conductor 186 to one terminal of a limiting resistor 187, the other terminal of the resistor 187 being connected to the power conductor 107. The relay 180 further comprises a core 188 that controls the movement of an armature in response to the difference between the signals in the coils 181 and 185, mechanical linkage diagrammatically illustrated at 189 being provided to a power switch 190, and specifically to the movable contact 191 thereof. The power switch 190 further includes a pair of contacts 192 and 193 that respectively cooperate with the movable contact 191, the movable contact 191 being in electrical connection with the contact 192 when the signal in the coil 181 exceeds that in the coil 185 and conversely, the movable 191 contact being in electrical connection with the contact 193 when the signal in the coil 185 exceeds that in the coil 181.

The power switch 190 controls the application of operating potential to the motor 91 which serves to move the lens assembly inwardly and outwardly with respect to the housing 11. More specifically, the motor 91 includes a first coil 93 which is connected between the conductors 104 and 108 and has the voltage of the battery 103 applied thereto as soon as the master switch 105 is closed. A second coil 94 is provided for the motor 91, the coil 94 having one terminal thereof connected by a conductor 194 to the switch contact 192 and having the other terminal thereof connected by a conductor 195 to the switch contact 193. The center of the coil 194 is connected to the conductor 108. When the power switch 190 is in the upper position, i.e., when the contacts 191 and 192 are in electrical connection one with the other, the potential of the battery 103 is applied to that portion of the coil 94 between the conductors 108 and 194, this condition occurring when the signal in the coil 181 exceeds that in the coil 185; conversely, when the power switch 190 is in the lower position thereof, i.e., when the contacts 191 and 193 are in electrical connection one with the other, the potential of the battery 103 is applied to that portion of the coil 94 between the conductors 108 and 195, this condition occurring when the signal in the coil 185 exceeds that in the coil 181. The motor 91 has the shaft 92 thereof connected by a drive member 95 to a connecting member 96 that is fixedly connected to the lens assembly, and specifically to the lens 12 (see FIG. 1 also) the direction of operation of the motor 91 and the direction of movement of the lens assembly depends upon which of the sections of the coil 94 is energized, the movement of the lens assembly being in one direction when one of the coil sections is energized and being in the other direction when the other of the coil sections is energized.

The portion of the scanning mechanism 40 disposed behind the rear wall of the housing 11, i.e., to the left thereof in FIG. 1, including the drive motor 55 therefor and the photodetector 70, is housed within an auxiliary rear housing 90 that is mounted upon the rear wall of the main housing 11 as is illustrated in FIG. 1. Also mounted within the auxiliary rear housing 90 and within an auxiliary bottom housing 97 are the various components of the electrical system 100 including the mounts for the batteries 101, 102 and 103, the amplifying network 110, the switch 131, the rectifying networks 140 and 150, the amplifiers 160 and 170, the differential relay 180, the switch 190, and the drive motor 91 including the gear train 95 interconnecting the output shaft 92 thereof and the member 96 connected to the lens 12. As is also illustrated in FIG. 1, the connecting member 96 extends upwardly from the auxiliary bottom housing 97 and is shiftable with respect thereto to cause a focusing movement of the lenses 12 and 13.

The output from the photodetector 70 in FIG. 4 is essentially a pulsating D.C. current that is applied as the input to the amplifying network 110, and specifically to the transistor 111. The A.C. component of the electrical signal from the photodetector 70 is amplified and inverted by the amplifying stage comprising the transistor 111 and the amplified and inverted electrical signal is applied to the input of the transistor 121. The amplifying stage comprising the transistor 121 further amplifies and also inverts the electrical signal received through the capacitor 118 from the transistor 111, whereby the output coupled through the capacitor 130 from the amplifying network 110 to the switch 131 is an amplified A.C. electrical signal corresponding in all respects other than amplitude to the A.C. component of the electrical signal derived from the photodetector 70.

As has been explained above, the switch 131 serves to connect selected portions of the output from the amplifying network 110 to the rectifying networks 140 and 150. More particularly, an A.C. electrical signal is applied along the conductor 137 to the rectifying network 140, the diode 143 rectifying the A.C. electrical signal to develop a pulsating D.C. potential across the resistor 148 in a well known manner. The potential across the resistor 148 serves to charge the capacitor 149, the capacitor 149 in cooperation with the resistors 147 and 148 forming a filtering circuit so as to provide a substantially uniform D.C. potential on the conductor 146 which is applied to bias the base 162 of the output amplifier 161, the amplitude of the D.C. potential being proportional to the amplitude of the A.C. electrical signal applied to the rectifier 140 which is in turn proportional to the electrical signal applied to the amplifying network 110 from the photodetector 70 which is in turn proportional to the intensity gradient of light incident upon the light receptive area 71 of the photodetector 70 from the light conductor 51.

The D.C. potential on the conductor 146 is utilized to control the state of conduction in the transistor 161 forming a part of the power amplifier 160. The state of conduction of the transistor 161 determines the current flowing through the coil 181 of the differential relay 180, the amount of current therethrough being proportional to the amplitude of the D.C. potential on the conductor 146 which comprises the primary control for the state of conduction of the transistor 161. The state of conduction of the transistor 161 in the absence of a D.C. potential on the conductor 146 can be set by moving the contact 167 on the resistor 168, such movement of the contact 167 also simultaneously adjusting the state of conduction for the transistor 171 for a no-signal condition.

Simultaneously, an A.C. electrical signal is also applied along the conductor 138 to the rectifying network 150, the diode 153 rectifying the A.C. electrical signal to develop a pulsating D.C. potential across the resistor 158 in a well known manner. The potential across the resistor 158 serves to charge the capacitor 159, the capacitor 159 in cooperation with the resistors 157 and 158 forming a filtering circuit so as to provide a substantially uniform D.C. potential on the conductor 156 which is applied to bias the base 172 of the output amplifier 171, the amplitude of the D.C. potential being proportional to the amplitude of the A.C. electrical signal applied to the rectifier 150 which is in turn proportional to the electrical signal applied to the amplified network 110 from the photodetector 70 which is in turn proportional to the intensity gradient of the light incident upon the light receptive area 71 of the photodetector 70 from the light conductor 61.

The D.C. potential on the conductor 156 is utilized to control the state of conduction in the transistor 171 forming a part of the power amplier 170. The state of conduction of the transistor 171 determines the current flowing through the coil 185 of the differential relay 180, the amount of current therethrough being proportional to the amplitude of the D.C. potential on the conductor 156 which comprises the primary control for the state of conduction of the transistor 171. As has been explained above, the state of conduction of the transistor 171 in the absence of D.C. signal on the conductor 156 is set by moving the contacts 167 on the resistor 168, such movement of the contact 167 also simultaneously adjusting the state of conduction for the transistor 171 for a no-signal condition.

When more current flows through the coil 181 than through the coil 185, the switch 190 is operated by the differential relay 180 to close the switch contacts 191–192 to apply the operating potential of the battery 103 across the portion of the coil 94 between the conductors 108 and 194, the application of such a potential to the coil 194 serving to operate the motor 91 in one direction and to cause a corresponding movement of the lens 12 in one direction. On the other hand, when more current flows through the coil 185 than through the coil 181, the switch 190 is operated by the differential relay 180 to close the switch contacts 191–193 to apply the potential of the battery 103 across the portion of the coil 94 between the conductors 108 and 195.

This causes operation of the motor 91 in the opposite direction to cause movement of the lens 12 in the opposite direction. Accordingly, the system is responsive not only to a difference in light intensity gradient at the two planes 54 and 64 but is also responsive to determine at which plane the light is of greatest intensity, the parts being arranged automatically to move the lens 12 to a position so that equal light intensities are scanned at the planes 54 and 64, respectively.

The manner in which the various parts described above cooperate to achieve automatic focusing of the camera 10 will now be described in detail. Referring first to FIG. 1, there is diagrammatically illustrated a field of view 200 defined by light ray 201 at the upper edge thereof and light ray 202 at the lower edge thereof, the light rays 201 and 202 being directed upon the lens 12 and being inverted thereby in the usual manner to cause an image to be projected upon the film 18 through the partially silvered mirror 31 when the shutter mechanism 19 is open. Disposed centrally of the field of view 200 is a generally circular area 203 of principal interest, the area 203 being defined by an upper light ray 204 and and a lower light ray 205 disposed equiangularly from the optical axis of the system which is diagrammatically illustrated at 206; the light rays 204 and 205 converge upon the lens 12 and are inverted thereby and are projected upon the partially silvered mirror 31. A portion of the light rays 204 and 205 are reflected upwardly by the mirror 31 and from the underside of the mirror 21 and are directed upon the scanning mechanism 40, the remainder of the rays 204 and 205 passing through the partially silvered mirror 31 and falling upon the film 18. Although the light rays have not been traced it will be understood that substantially the same field of view 200 is also seen through the lens 13 and is projected along the path 209 upon the ground glass 24.

Further details of the optical system are illustrated in FIG. 5 wherein the area 203 of principal interest includes portions of an object 210 having white areas 211, 213 and 215 and alternate dark or black areas 212 and 214, the areas being arranged horizontally so that the junctures therebetween form horizontal lines with the circular area 203 including portions of all of the areas 211 through 215. The portion of the object 210 that is scanned by the scanning mechanism 40 is actually an annular band 207 which has the periphery of the area 203 as the outer periphery thereof and which has a radial extent equal to the projection of the inlet 52 or the inlet 62 of the light conductors 51 and 61, respectively. In the optical imaging system, the area 203 of principal interest can be considered to be defined by the upper light ray 204 and the lower light ray 205 which at the object 210 are spaced apart vertically a distance equal to the diameter of the area 203, the light rays 204 and 205 being disposed at equal angles from the optical axis which is diagrammatically represented at 206. The rays 204 and 205 converge upon the lens assembly 12 and are projected rearwardly upon the partially silvered upper surface of the mirror 31; portions of these light rays are reflected upwardly and are then reflected from the lower surface of the mirror 21 and continue rearwardly to the various planes 20, 54 and 64. As illustrated, the parameters of the optical imaging system including the lens assembly 12 and the focal position or plane 20 have been so selected that a focused image 210a of the object 210 is provided at the focal position 20 and accordingly, a defocused image 210f, i.e., an image with reduced contrast or reduced intensity gradient, is provided at the plane 64 in front of the focal position 20 and a defocused image 210b, i.e., an image with reduced contrast or reduced intensity gradient, is provided at the plane 54 in back of the focal position 20. As is diagrammatically illustrated, the annular area 207 at the object 210 is scanned by the inlet 62 of the light conductor 61 in the plane 64 through an annular area designated 207f and the annular area 207 at the object 210 is likewise scanned by the inlet 52 of the light conductor 51 in the plane 54 through an annular area designated 207b; as is diagrammatically illustrated by the smaller representations of the object 210 at 210a, 210b and 210f, the intensity gradient of the image is greatest at the plane of focus which is at the focal plane 20 as illustrated in FIG. 5, and is substantially less sharply defined or blurred at the planes spaced from the focal 20, such as at the scanning planes 54 and 64, whereby the images 210b and 210f are substantially less sharply defined and more blurred than the image 210a. In order to simplify the description of the optical imaging system of FIG. 5, the mask 80 has been omitted therefrom, but it will be understood that in the camera 10 of FIG. 1 only one-half, i.e., the lower half (due to the image inversion by the lens) of the annular area 207 is scanned, namely, the lower half of the area designated by the numeral 208 therein. However, the principal of scanning is the same and the intensity of the images scanned is the same, namely, most intense and clear at the focal position, and progressively less intense and blurred at distances disposed away from the focal position.

The area chosen to be scanned is preferably only a small portion of the total area of the field of view 200, and may constitute for example from about 0.5% to about 10% of the total field of view 200, a typical value being 3%. Although as illustrated the area chosen to be scanned is disposed centrally in the field of view, the area to be scanned might be at some other portion of the total field of view 200, but generally the object of principal interest is in the center of the field of view, and accordingly, the preferred area to be scanned is an area disposed centrally of the total field of view 200. Likewise, although the invention has been illustrated in a system wherein the lens 12 is moved with respect to the focal position 20, it is to be understood that the invention could be equally utilized in a system wherein some other parameter of the optical imaging system was changed, such for example, as the shape or constitution of the lens assembly 12 without changing the distance to the focal position 20, or the focal position 20 could be moved with respect to the lens 12.

As has been described heretofore, the light conductors 51 and 61 when the inlets 52 and 62, respectively, are rotated in the planes 54 and 64, respectively, scan the images 210b and 210f; the light received thereat in scanning the upper half of the areas 207b and 207f is conducted to the photodetector 70 and impinged upon the light receptive surface 71 thereof and converted into pulsating electrical signals which correspond with the intensity gradient or contrast along the scanned path in the plane of rotation. Referring to FIG. 6 of the drawings, the types of signals produced when scanning the object 210 have been shown for purposes of illustration, the signals having been illustrated for several conditions of focus, all of the signals having been obtained with the mask 80 in the operative position illustrated in FIGS. 2 and 3. For ease in illustration, the points at which the scanning area 207 crosses a boundary between one of the dark areas 212 or 214 and an adjacent white area 211, 213 or 215 in FIG. 5 have been assigned letters of the alphabet for reference purposes, the points having been lettered A, B, C, etc. in a counterclockwise direction beginning in the lower left-hand corner of the object 210. These same letters have been applied in FIG. 6 to orient the electrical signals with respect to the scanning of object 210, corresponding vertical lines A, B, C, D, etc. in FIG. 6 corresponding to the like lettered points on the object 210 in FIG. 5.

Referring to FIG. 6A, the maximum signal that can be obtained is illustrated, i.e., when the imaging system focuses the object 210 in the plane 54, for example. At point A the light conductor 51 receives maximum light from the white area 211 and therefore a maximum amplitude of electrical signal is obtained from the photodetector 70 as illustrated. This maximum intensity of signal is maintained to point B, but immediately after leaving point B and entering the dark area 212, the light incident upon the light conductor 51 drops to a minimum value and the electrical signal produced by the photodetector 70 likewise drops to a minimum value. So long as the scan is in the dark area 212, a minimum electrical signal will be obtained. Upon arriving at the point C, a maximum signal again will be obtained due to the reception of light from the white area 213, and the signal from the photodetector 70 will rise to the maximum value. Midway between points C and D, the inlet 52 of the light conductor 51 will move behind the mask 80 and therefore the electrical signal will fall to a minimum value midway between points C and D. The inlet end 52 of the light conductor 51 will remain behind the mask 80 from midway between points C and D to midway between points G and H, at which time it will emerge from behind the mask 80 and will receive intense light from the white area 213 to produce from the photodetector 70 the maximum electrical signal, as illustrated, the maximum signal being produced until point H is reached. In crossing the line between the light area 213 and the dark area 212 at point H, the minimum light is received and a minimum signal is obtained as output from the photodetector 70, and this minimum signal persists between points H and A. Upon reaching point A, a maximum signal is again obtained and the cycle of operation repeated as described above.

In FIGS. 6B and 6C the signals obtained at the planes 54 and 64, respectively, are illustrated when the camera 10 is in focus, i.e., with the brightest image of the object 210 is at the focal plan 20. It will be observed that the signal obtained in the plane 54 and illustrated in FIG. 6B is similar to that illustrated in FIG. 6A and described in detail above. Due to the blurring of the image 210b at the plane 54, the scanning thereof along the path 207b produces an electrical signal having lower maximum value but slightly higher minimum values except in the areas where the mask 80 completely interrupts the signal. More specifically, at the point A due to the blurring of the line between the areas 211 and 212, a substantially less than maximum electrical signal is obtained from the photodetector 70, and that signal increases as the scanning moves more fully into the white area 211 and likewise decreases as the scanning moves toward point B and the now indistinct line between the light area 211 and the dark area 212. Even in the dark area 212 between points B and C, a certain amount of light is received in the blurred image 210b, and accordingly, the voltage does not drop to a minimum but does fall below the value at points A and B. As the scanning leaves the dark area 212 at point C, the voltage increases until the inlet 52 reaches the edge of the mask 80 midway between the points C and D, at which time the voltage drops to the minimum value and stays there so long as the inlet 52 is behind the mask 80, i.e., until the scanning arrives midway between the points G and H. Midway between the points G and H, the inlet 52 moves from behind the mask 80 and receives a strong signal that produces an output voltage substantially equal to that midway between points A and B and midway between points C and D. As the scanning approaches point H, the amplitude of the signal decreases and reaches a minimum midway between points H and A in the dark area 212, and then begins rising and is still rising when point A is reached. The cycle is then repeated as illustrated.

The signal developed by scanning at the plane 64 is illustrated in FIG. 6C, the wave form being identical to that in FIG. 6B but shifted in time 180° out of phase with respect thereto as illustrated; otherwise, the signal in FIG. 6C is the same and is equal in amplitude to that in FIG. 6B.

In the operation of the electrical circuit 100 in FIG. 4, the combined electrical signal of FIGS. 6B and 6C is fed from the photodetector 70 through the amplifying network 110 and the switch 131 serves to separate again the amplified A.C. component of the signal into two separate electrical signals, whereby an amplified electrical signal like the A.C. component of that in FIG. 6B is fed along the conductor 137 to the rectifying network 140, and an amplified electrical signal like the A.C. component of that in FIG. 6C is fed along the conductor 138 to the rectifying network 150. When rectified, these two electrical signals are then applied as the inputs to the power amplifiers 160 and 170, respectively, and there are produced two output D.C. electrical signals that are of identical amplitude and which are applied to the differential relay 180. Since the electrical signals are of the same amplitude, i.e., the conduction through the coils 181 and 185 is the same, the relay 180 is not operated and the motor 91 is accordingly, not operated, whereby the focus of the camera 10 remains unchanged.

Referring now to FIGS. 6D and 6E there are illustrated the electrical signals obtained at the planes 54 and 64, respectively, when the camera 10 is out of focus, i.e., when the brightest image is between the planes 20 and 54. It will be observed that the electrical signals obtained in the plane 54 and illustrated in FIG. 6D are similar to those illustrated in FIGS. 6A and 6B, and in fact intermediate in shape and amplitude therebetween. More specifically, the amplitude of the electrical signals in FIG. 6D is greater than that in FIG. 6B because the image 210b is now less blurred than when the camera 10 is in focus, yet since the image is not focused at the plane 54, the electrical signal of FIG. 6A is not obtained. At the point A there is less blurring as compared to the condition in FIG. 6B, whereby the amplitude of the electrical signal between points A and B substantially rises, but not to the maximum illustrated in FIG. 6A, and likewise, in going from point B to point C the electrical signal falls to a lower minimum value than in FIG. 6B, but not to so low a value as in FIG. 6A. As the scanning moves toward point D, the electrical signal increases until the inlet 52 reaches the edge of the mask 80 midway between the points C and D, at which time the voltage drops to the minimum value and stays there so long as the inlet 52 is behind the mask 80, i.e., until the scanning arrives midway between the points G and H. Midway between points G and H, the inlet 52 moves from behind the mask 80 and receives a strong light input that produces an output voltage substantially equal to that midway between points A and B and midway between points C and D. As the scanning approaches point H, the amplitude of the electrical signal decreases and reaches a minimum midway between the points H and A in the dark area 212, and then begins rising and is still rising when point A is reached. The cycle is then repeated as illustrated.

The electrical signal developed by scanning at the plane 64 is illustrated in FIG. 6E, the wave form being identical in shape to but substantially less in amplitude than that illustrated in FIG. 6C. This results from the fact that the image formed at the plane 64 is even more blurred in the case illustrated in FIG. 6C, whereby there is substantially less contrast between the light areas 211, 213 and 215 on the one hand and the dark areas 212 and 214 on the other hand. It further will be noted that the electrical signal illustrated in FIG. 6E is shifted in time 180° out of phase with respect to the companion electrical signal illustrated in FIG. 6D.

When the electrical signals illustrated in FIGS. 6D and 6E are fed from the photodetector 70, they are combined in the amplifying network 110 and the A.C. components thereof are amplified thereby; the amplified A.C.

electrical signals when applied to the switch 131 are again separated into two separate amplified A.C. electrical signals, whereby an amplified electrical signal like the A.C. component of that in FIG. 6D is fed along the conductor 137 to the rectifying network 140, and an amplified electrical signal like the A.C. component of that in FIG. 6E is fed along the conductor 138 to the rectifying network 150. When rectified, the resulting two D.C. signals are then applied to the power amplifiers 160 and 170, respectively, and there are produced two output currents which are applied to the coils of the differential relay 180. Since the electrical signal corresponding to that illustrated in FIG. 6D is fed through the rectifying network 140 and the amplifier 160 while the electrical signal corresponding to that illustrated in FIG. 6E is fed through the rectifying network 150 and the amplifier 170, the coil 181 will receive a substantially stronger current therethrough than the coil 185, whereby to cause the switch 190 to be moved so that the contact 191 is in electrical connection with the contact 192. As a consequence, the portion of the coil 94 between the conductors 108 and 194 will be energized to cause operation of the motor 91 thus effecting movement of the lens assembly 12 in a predetermined direction. The direction of movement of the lens assembly 12 is such as to shift the focused image of the object 210 toward the focal position 20. During such shifting of the lens assembly 12 and the focused image, the amplitude of the electrical signal illustrated in FIG. 6D will gradually decrease and will approach that illustrated in FIG. 6B, while the amplitude of the electrical signal illustrated in FIG. 6E will correspondingly increase toward that illustrated in FIG. 6C. When the electrical signals developed are like those illustrated in FIGS. 6B and 6C, the differential relay 180 will no longer be operated and the electrical connection between the contacts 191 and 192 will be broken; this will de-energize the coil 94 and cause the motor 91 to stop operation, thus placing the lens assembly 12 in the proper position to focus an image of the object 210 at the focal position 20.

Finally, in FIGS. 6F and 6G there are illustrated the electrical signals obtained at the planes 54 and 64, respectively, when the camera 10 is out of focus with the brightest image between the planes 20 and 64. The image at plane 54 will now be even more blurred and indistinct than that illustrated in FIG. 6B, and accordingly, the amplitude of the electrical signal obtained when the inlet 52 of the light conductor 51 is not behind the mask 80 will be even less, and as illustrated is of the same order of magnitude as that illustrated in FIG. 6E described above. The general shape and form of the electrical signal, however, is the same, only the amplitude of the A.C. component thereof being diminished. Conversely, the image at the plane 64 is more distinct and less blurred than that illustrated in FIGS. 6C and 6E, whereby the magnitude of the A.C. component of the electrical signal is substantially increased and is of the same order of magnitude as that illustrated in FIG. 6D described above. Again, the electrical signals in FIGS. 6F and 6G are shifted in time 180° out of phase with respect to each other and are of the same general form but differ substantially only in the magnitude of the A.C. component thereof.

When the electrical signals illustrated in FIGS. 6F and 6G are applied from the photodetector 70 in the electrical circuit 100 of FIG. 4, a combined electrical signal is fed from the photodetector 70 through the amplifying network 110. The switch 131 serves again to separate the amplified signal into two separate electrical signals, whereby an amplified electrical signal like the A.C. component of that in FIG. 6F is fed along the conductor 137 to the rectifying network 140, and an amplified electrical signal like the A.C. component of that in FIG. 6G is fed along the conductor 138 to the rectifying network 150. When rectified, these two electrical signals are then applied as the input to the power amplifiers 160 and 170, respectively, and there are produced two output D.C. electrical signals that are of generally the same form but of different amplitude, the amplitude of the D.C. signal from the amplifier 170 being substantially larger than the amplitude of the D.C. signal from the amplifier 160 in accordance with the differences between the amplitudes of the A.C. components of the input signals illustrated, respectively, in FIGS. 6G and 6F. Since the amplitude of the current from the amplifier 170 and applied to the coil 185 is greater than that from the amplifier 160 and applied to the coil 181, the differential relay 180 is operated to place the movable contact 191 of the switch 190 in electrical connection with the contact 193, whereby to apply the potential of the battery 103 across that portion of the coil 93 disposed between the conductors 108 and 195. The application of such a potential to the coil 94 serves to operate the motor 91 in a direction to move the lens assembly 12 so as to move the focused image of the object 210 toward the focal position 20, this direction of movement being opposite to that described above in discussing the application of the electrical signals of FIGS. 6D and 6E to the electrical circuit 100. During such shifting of the lens assembly 12 and the focused image, the amplitude of the A.C. component of the electrical signal illustrated in FIG. 6G will gradually decrease and will approach that illustrated in FIG. 6C, while the amplitude of the A.C. component of the signal illustrated in FIG. 6F will correspondingly increase toward that illustrated in FIG. 6B. When the electrical signals developed are like those illustrated in FIGS. 6B and 6C, the differential relay 180 will no longer be operated and the electrical connection between the contacts 191 and 193 will be broken; this will de-energize the coil 94 and cause the motor 91 to stop operation, thus placing the lens assembly 12 in the proper position to focus the image of the object 210 at the focal position 20.

It also will be understood that if the distance between the camera 10 and the object 210 changes while the automatic focusing mechanism is operating, the mechanism will operate to maintain the object 210 focused upon the focal position 20 by moving the lens 12 with respect thereto, whereby the object 210 will continue to be in focus so long as the camera 10 is directed thereat and the automatic focusing mechanism is operating.

Recapitulating, there is illustrated in FIG. 6A the maximum electrical signal that can be obtained from the photodetector 70 when scanning the object 210, by one of the light ducts, i.e., the electrical signal obtained when the object 210, is focused at the plane 54, for example. When the scanning mechanism 40 scans an image not at the focal position, the amplitude of the A.C. component of the electrical signal obtained from the photodetector 70 is decreased, fundamentally because the image is blurred and indistinct and exhibits substantially less contrast between the lighter areas and the darker areas thereof. Since the scanning mechanism 40 scans in two planes 54 and 64 disposed equal distances respectively in back of and in front of the focal position 20, the signals obtained by scanning in the two planes are equal when the camera 10 is in focus, the shape and amplitude of the electrical signals being illustrated in FIGS. 6B and 6C, respectively. Since there is no difference in the amplitude of the A.C. component between the two signals, equal rectified and amplified signals will be applied to the two coils 181 and 185 of the differential relay 180, whereby no operation thereof is obtained, and no operation of the motor 91 and no movement of the lens assembly 12 is realized.

If the focused image of the object 210 is not at the focal position 20 but is disposed toward one of the planes 54 or 64, the scanning in the plane toward which the focused image is shifted will produce a larger A.C. component of the electrical signal than is the case when the camera 10 is focused, and correspondingly, the scanning in the plane away from that toward which the focused image is shifted will produce a smaller electrical signal.

As illustrated in FIGS. 6D and 6E, if the brightest or focused image is shifted toward the plane 54, then scanning in the plane 54 will produce an electrical signal having an A.C. component of greater amplitude as illustrated in FIG. 6D, while scanning in the plane 64 will produce an electrical signal having an A.C. component or smaller amplitude as illustrated in FIG. 6E. When these signals are rectified and amplified and applied to the differential relay 180, the larger signal applied to the coil 181 will cause the switch contacts 191 and 192 to be closed thus to energize the coil 94 in one direction and to cause the operation of the motor 91 in a given direction and movement of the lens assembly 12 in a given direction, such movement of the lens assembly 12 being such as to move the focused or brightest image toward the focal position 20.

On the other hand, if the camera 10 is out of focus with the focused or brightest image disposed toward the plane 64, scanning in the plane 64 will produce an electrical signal having an A.C. component of increased amplitude, while scanning in the plane 54 will produce an electrical signal having an A.C. component of decreased amplitude, these signals being illustrated in FIGS. 6G and 6F, respectively. Upon rectification and amplification of these electrical signals and the application thereof to the differential relay 180, the larger electrical signal being applied to the coil 185 will cause the relay 180 to operate to close the switch contacts 191 and 193 thus energizing the coil 94 in the opposite direction and to cause the motor 91 to operate in the opposite direction and to move the lens assembly 12 in the opposite direction. Such movement of the lens assembly 12 will tend to move the focused or brightest image toward the focal position 20, and when the brightest image reaches the focal position 20, the electrical signals illustrated in FIGS. 6B and 6C will be generated, whereby to cause the differential relay 180 to return to the non-actuated position thereof, thus de-energizing the coil 94 to stop the motor 91 and to stop the movement of the lens assembly 12 in the focused position thereof.

In an illustrative constructional example of the automatic focusing apparatus, the support member 47 is rotated at 60 revolutions per second; the diameter of the light conductors 51 and 61 is 0.005"; the transistor 111 is of the 2N2613 type; the resistor 117 has a value of 3900 ohms; the capacitor 118 has a value of 3 micromicrofarads; the resistor 119 has a value of 150,000 ohms; the resistor 120 has a value of 4700 ohms; the transistor 121 is of the 2N217 type; the resistor 127 has a value of 516,000 ohms; the resistor 129 has a value of 25 ohms; the capacitor 130 has a value of 1 micromicrofarad; the resistors 141 and 151 have a value of 82,000 ohms; the resistors 142 and 152 have a value of 10,000 ohms; the rectifiers 143 and 153 are of the silicon diode type; the resistors 147 and 157 have a value of 68,000 ohms; the resistors 148 and 158 have a value of 8200 ohms; the capacitors 149 and 159 have a value of 30 micromicrofarads; the transistors 161 and 171 are of the 2N417 type; the resistor 168 has a value of 500 ohms; the resistors 183 and 187 have a value of 3900 ohms; each of the batteries 101 and 102 has an output potential of 2.7 volts; and the battery 103 has an output potential of 9 volts.

A preferred form of the photodetector 70 is the type LSX-518 manufactured by the Texas Instrument Company. In general, the photodetector 70 must have a resolution comparable to that of the receptor resolution at the focal position 20, for example, the resolution of the film that is placed at the focal position 20, which may be for example 100 lines per millimeter.

From the above it will be seen that there has been provided an automatic focusing apparatus and automatic focusing methods which fulfill all of the objects of the invention. More specifically, there has been provided such apparatus and methods wherein the focusing is accomplished by detecting image contrast and adjusting the focus to achieve high image contrast, sharp focus corresponding to high image contrast. The scanning of the image being focused upon is in a restricted field of view so as to eliminate ambiguities that arise from the fact that various objects in the field of view may be at various ranges, the scanning being preferably in the central area of the total field of view. The automatic focusing apparatus and methods are capable of determining whether the focused image is in front of or in back of the focal position 20 and are immediately operable automatically to move the lens 12 to focus the image at the focal position 20. The operation of the automatic focusing apparatus and methods are furthermore essentially independent of the light intensity at and geometry of the image of the object being scanned.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Apparatus for automatically focusing upon an object within a field of view wherein the object has an area of contrast of light intensity thereat, said apparatus comprising an optical imaging system including a focal position and a lens assembly for directing an image of the field of view upon the focal position along the optical axis thereof, motor means for changing a parameter of said optical imaging system to change the focusing of the object in the field of view with respect to the focal position, first mechanism for scanning an image of the object spaced a predetermined distance in front of said focal position and in the area of contrast of light intensity, second mechanism for scanning an image of the object spaced said predetermined distance in back of said focal position and in the same area of contrast of light intensity, means for generating a first electrical signal related to the light received in scanning by said first mechanism, means for generating a second electrical signal related to the light received in scanning by said second mechanism, and means responsive to the difference between said first and second electrical signals for operating said motor means to change a parameter of said optical imaging system to focus an image of the object at said focal position.

2. Apparatus for automatically focusing upon an object within a field of view wherein the object has an area of contrast of light intensity thereat, said apparatus comprising an optical imaging system including a focal position and a lens assembly for directing an image of the field of view upon the focal position along the optical axis thereof, motor means for changing a parameter of said optical imaging system to change the focusing of the object in the field of view with respect to the focal position, mechanism for alternately scanning an image of the object spaced a predetermined distance in front of said focal position in the area of contrast of light intensity and an image of the object spaced said predetermined distance in back of said focal position in the same area of contrast of light intensity, means for generating a first electrical signal related to the light received in scanning in front of said focal position and a second electrical signal related to the light received in scanning in back of said focal position, and means responsive to the difference between said first and second electrical signals for operating said motor means to change a parameter of said optical imaging system to focus an image of the object at said focal position.

3. Apparatus for automatically focusing upon an object within a field of view wherein the object has an area of contrast of light intensity thereat, said apparatus comprising an optical imaging system including a focal position and a lens assembly for directing an image of the field of view upon the focal position along the optical axis thereof, motor means for changing a parameter of said optical imaging system to change the focusing of the object in the field of view with respect to the focal position, mechanism for alternately scanning an image of the object spaced a predetermined distance in front of said focal position in the area of contrast of light intensity and an image of the object spaced said predetermined distance in back of said focal position in the same area of contrast of light intensity, a photodetector for generating an electrical signal when light is directed thereupon, means for alternately conducting to said photodetector the light received in scanning the image of the object spaced in front of said focal position and the light received in scanning the image of the object spaced in back of said focal position, said photodetector generating a first electrical signal having an amplitude proportional to the light received in scanning in front of said focal position and a second electrical signal having an amplitude proportional to the light received in scanning in back of said focal position, and means responsive to the difference between said first and second electrical signals for operating said motor means to change a parameter of said optical imaging system to focus an image of the object at said focal position.

4. Apparatus for automatically focusing upon an object within a field of view wherein the object has an area of contrast of light intensity thereat, said apparatus comprising an optical imaging system including a focal position and a lens assembly for directing an image of the field of view upon the focal position along the optical axis thereof, motor means for changing a parameter of said optical imaging system to change the focusing of the object in the field of view with respect to the focal position, mechanism for alternately scanning an image of the object spaced a predetermined distance in front of said focal position in the area of contrast of light intensity and an image of the object spaced said predetermined distance in back of said focal position in the same area of contrast of light intensity, a photodetector for generating an electrical signal when light is directed thereupon, means for alternately conducting the light received in scanning the image of the object spaced in front of said focal position to said photodetector and the light received in scanning the image of the object spaced in back of said focal position to said photodetector, said photodetector generating a first electrical signal having an amplitude proportional to the light received in scanning in front of said focal position and a second electrical signal having an amplitude proportional to the light received in scanning in back of said focal position, a first detecting network for generating a third electrical signal related to said first electrical signal, a second detecting network for generating a fourth electrical signal related to said second electrical signal, means for connecting the output of said photodetector alternately to said first detecting network to apply said first electrical signal thereto and to said second detecting network to apply said second electrical signal thereto, and power means responsive to the difference between said third and fourth electrical signals for operating said motor means to change a parameter of said optical imaging system to focus an image of the object at said focal position.

5. The apparatus set forth in claim 4, wherein a first amplifying network is provided between said photodetector and said connecting means for amplifying said first and second signals, a second ampliying network is provided between said first rectifying network and said power means for amplifying said third electrical signal, and a third amplifying network is provided between said second detecting system and said power means for amplifying said fourth electrical signal.

6. A camera for automatically focusing upon an object in a field of view wherein the object has an area of contrast of light intensity thereat, said camera comprising a frame having a film holder mounted thereon at a focal position and a lens assembly mounted thereon for directing an image of the field of view upon the focal position along the optical axis thereof, motor means for moving said film holder and said lens assembly toward and away from each other to change the focusing of the object in the field of view with respect to the focal position, first mechanism mounted on said frame adjacent to said film holder for scanning an image of the object spaced a predetermined distance in front of said focal position along a predetermined path in the area of contrast of light intensity, second mechanism mounted on said frame adjacent to said film holder for scanning an image of the object spaced said predetermined distance in back of said focal position and along the same path in the same area of contrast of light intensity, means mounted on said frame for generating a first electrical signal related to the light received in scanning by said first mechanism, means mounted on said frame for generating a second electrical signal related to the light received in scanning by said second mechanism, and means responsive to the difference between said first and second electrical signals for operating said motor means to move said film holder and said lens assembly toward and away from each other to focus an image of the object at said focal position upon said film holder.

7. A camera for automatically focusing upon an object in a field of view wherein the object has an area of contrast of light intensity thereat, said camera comprising a frame having a film holder mounted thereon at a focal position and a lens assembly mounted thereon for directing an image of the field of view upon the focal position along the optical axis thereof, motor means for moving said film holder and said lens assembly toward and away from each other to change the focusing of the object in the field of view with respect to the focal position, mechanism mounted on said frame adjacent to said film holder for alternately scanning an image of the object spaced a predetermined distance in front of said focal position along a path in the area of contrast of light intensity and an image of the object spaced said predetermined distance in back of said focal position along the same path in the same area of contrast of light intensity, means mounted on said frame for generating a first electrical signal related to the light received in scanning in front of said focal position and a second electrical signal related to the light received in scanning in back of said focal position, and power means mounted on said frame and responsive to the difference between said first and second electrical signals for operating said motor means to move said film holder and said lens assembly toward and away from each other to focus an image of the object at said focal position upon said film holder.

8. A camera for automatically focusing upon an object in a field of view wherein the object has an area of contrast of light intensity thereat, said camera comprising a frame having a film holder mounted thereon at a focal position and a lens assembly mounted thereon for directing an image of the field of view upon the focal position along the optical axis thereof, first motor means for moving said film holder and said lens assembly toward and away from each other to change the focusing of the object in the field of view with respect to the focal position, a photodetector mounted on said frame and operative upon the receipt of light thereon to generate an electrical signal, a first light conductor mounted on said frame and having an inlet mounted for movement in a predetermined path in a plane parallel to said focal position and disposed a predetermined distance in front thereof and having an outlet directly upon said photodetector, a second light conductor mounted on said frame and having an inlet mounted for movement in a predetermined path in a plane parallel to said focal position and disposed said predetermined distance in back thereof and having an outlet directed upon said photodetector, second motor means mounted on said frame for moving said inlets along said predetermined paths whereby said first inlet scans an image of the object spaced a predetermined distance in front of said focal position and said second inlet scans an image of the object spaced said predetermined distance in back of said focal position and both along the same path and in the same area of contrast of light intensity, said photodetector generating a first electrical signal having an amplitude proportional to the light received in scanning in front of said focal position and a second electrical signal having an amplitude proportional to the light received in scanning in back of said focal position, and power means responsive to the difference between said first and second electrical signals for operating said first motor means to move said film holder and said lens assembly toward and away from each other to focus an image of the object at said focal position upon said film holder.

9. A camera for automatically focusing upon an object in a field of view wherein the object has an area of contrast of light intensity thereat, said camera comprising a frame having a film holder mounted thereon at a focal position and a lens assembly mounted thereon for directing an image in the field of view upon the focal position along the optical axis thereof, first motor means for moving said film holder and said lens assembly toward and away from each other to change the focusing of the object in the field of view with respect to the focal position, a photodetector mounted on said frame and operative upon the receipt of light thereon to generate an electrical signal, a first light conductor mounted on said frame and having an inlet mounted for movement in a predetermined path in a plane parallel to said focal position and disposed a predetermined distance in front thereof and having an outlet directly upon said photodetector, a second light conductor mounted on said frame and having an inlet mounted for movement in a predetermined path in a plane parallel to said focal position and disposed said predetermined distance in back thereof and having an outlet directed upon said photodetector, second motor means mounted on said frame for moving said inlets along said predetermined paths whereby said first inlet scans an image of the object spaced a predetermined distance in front of said focal position and said second inlet scans an image of the object spaced said predetermined distance in back of said focal position and both along the same path and in the same area of contrast of light intensity, said photodetector generating a first electrical signal having an amplitude proportional to the light received in scanning in front of said focal position and a second electrical signal having an amplitude proportional to the light received in scanning in back of said focal position, a first detecting network mounted on said frame for generating a third electrical signal related to said first electrical signal, a second detecting network mounted on said frame for generating a fourth electrical signal related to said second electrical signal, switch means driven by said second motor means for alternately connecting the output of said photodetector to said first detecting network to apply said first electrical signal thereto and then to said second detecting network to apply said second electrical signal thereto, and power means responsive to the difference between said third and fourth electrical signals for operating said first motor means to move said film holder and said lens assembly toward and away from each holder to focus an image of the object at said focal position upon said film holder.

10. The method of automatically focusing upon an object in a field of view wherein the object has an area of contrast of light intensity thereat, said method comprising the steps of providing an optical imaging system including a focal position and a lens assembly for directing an image of the field of view upon the focal position along the optical axis thereof, providing motor means for changing a parameter of said optical imaging system to change the focusing of the object in the field of view with respect to the focal position, generating a first electrical signal modulated in accordance with the intensity of the light received in scanning an image of the object spaced a predetermined distance in front of said focal position and in the area of contrast of light intensity, generating a second electrical signal modulated in accordance with the intensity of the light received in scanning an image of the object spaced said predetermined distance in back of said focal position and in the same area of contrast of light intensity, and operating said motor means in response to the difference between modulations on said first and second electrical signals to change a parameter of said optical imaging system to focus an image of the object at said focal position.

11. The method of automatically focusing upon an object in a field of view wherein the object has an area of contrast of light intensity thereat, said method comprising the steps of providing an optical imaging system including a focal position and a lens assembly for directing an image of the field of view upon the focal position along the optical axis thereof, providing motor means for changing a parameter of said optical imaging system to change the focusing of the object in the field of view with respect to the focal position, generating a first electrical signal modulated in accordance with the intensity of the light received in scanning an image of the object that is a small portion of the field of view and that is spaced a predetermined distance in front of said focal position and in the area of contrast of light intensity, generating a second electrical signal modulated in accordance with the intensity of the light received in scanning an image of the object that is a small portion of the field of view and that is spaced said predetermined distance in back of said focal position and in the same area of contrast of light intensity, and operating said motor means in response to the difference between modulations on said first and second electrical signals to change a parameter of said optical imaging system to focus an image of the object at said focal position.

12. The method set forth in claim 11, wherein the scanning of said images is in a portion of the field disposed substantially centrally thereof and that is from about 0.5% to about 10% of the total field of view.

13. The method of automatically focusing upon an object in a field of view wherein the object has an area of contrast of light intensity thereat, said method comprising the steps of providing an optical imaging system including a focal position and a lens assembly for directing an image of the field of view upon the focal position along the optical axis thereof, providing motor means for changing a parameter of said optical imaging system to change the focusing of the object in the field of view with respect to the focal position, alternately scanning an image of the object spaced a predetermined distance in front of said focal position in the area of contrast of light intensity and an image of the object spaced said predetermined distance back of said focal position in the same area of contrast of light intensity, generating a first electrical signal related to the light received in scanning in front of said focal position and a second electrical signal related to the light received in scanning in back of said focal position, and operating said motor means in response to the difference between said first and second electrical signals to change a parameter of said optical imaging system to focus an image of the object at said focal position.

14. The method of automatically focusing upon an object in a field of view wherein the object has an area of contrast of light intensity thereat, said method comprising the steps of providing an optical imaging system including a focal position and a lens assembly for directing an image of the field of view upon the focal position along the optical axis thereof, providing motor means for changing a parameter of said optical imaging system to change the focusing of the object in the field of view with respect to the focal position, providing a photodetector for generating an electrical signal when light is directed thereupon that is proportional to the intensity of the light, alternately scanning an image of the object spaced a predetermined distance in front of said focal position in the area of contrast of light intensity and an image of the object spaced said predetermined distance in back of said focal position in the same area of contrast of light intensity, alternately conducting the light received in scanning the image of the object spaced in front of said focal position to said photodetector and the light received in scanning the image of the object spaced in back of said focal position to said photodetector, whereby to generate a first electrical signal from said photodetector having an amplitude proportional to the light received in scanning in front of said focal position and a second electrical signal having an amplitude proportional to the light received in scanning in back of said focal position, and operating said motor means in response to the difference between said first and second electrical signals to change a parameter of said optical imaging system to focus an image of the object at said focal position.

15. The method of automatically focusing upon an object in a field of view wherein the object has an area of contrast of light intensity thereat, said method comprising the steps of providing an optical imaging system including a focal position and a lens assembly for directing an image of the field of view upon the focal position along the optical axis thereof, providing motor means for changing a parameter of said optical imaging system to change the focusing of the object in the field of view with respect to the focal position, providing a photodetector for generating an electrical signal when light is directed thereupon that is proportional in amplitude to the intensity of the light, providing a first detecting network and a second detecting network, alternately scanning an image of the object spaced a predetermined distance in front of said focal position in the area of contrast of light intensity and an image of the object spaced a predetermined distance in back of said focal position in the same area of contrast of light intensity, alternately conducting the light received in scanning the image of the object in front of said focal position to said photodetector and the light received as scanning the image of the object spaced in back of said focal position to said photodetector, whereby said photodetector generates a first electrical signal having an amplitude proportional to the light received in scanning in front of said focal position and a second electrical signal having an amplitude proportional to the light received in scanning in back of said focal position, alternately connecting the output of said photodetector to said first detecting network to apply said first electrical signal thereto to produce a third electrical signal therefrom and to said detecting network to apply said second electrical signal thereto to produce a fourth electrical signal therefrom, and operating said motor means in response to the difference between said third and fourth electrical signals to change a parameter of said optical imaging system to focus an image of the object at said focal position.

16. The method set forth in claim 15, wherein said first and second electrical signals from said photodetector are amplified before being connected to said first and second detecting networks respectively, and said third electrical signal and said fourth electrical signal are amplified before operating said motor means in response to the difference therebetween.

17. The apparatus set forth in claim 1, wherein said motor means changes the distance between said focal position and said lens assembly to focus an image of the object at said focal position.

18. The apparatus set forth in claim 1, wherein said motor means moves said lens assembly toward and away from said focal position to focus an image of the object at said focal position.

19. The apparatus set forth in claim 1, wherein the amplitude of said first electrical signal is proportional to the light received in scanning an image of an object spaced a predetermined distance in front of the focal position, and the amplitude of said second electrical signal is proportional to the light received in scanning an image of the object spaced said predetermined distance in back of said focal position.

20. Apparatus for automatically focusing upon an object within a field of view wherein the object has an area of contrast of light intensity thereat, said apparatus comprising an optical imaging system including a focal position and a lens assembly for directing an image of the field of view upon the focal position along the optical axis thereof, motor means for changing a parameter of said optical imaging system to change the focusing of the object in the field of view with respect to the focal position, first mechanism for scanning an image of the object that is a small portion of the field of view and that is spaced a predetermined distance in front of said focal position and in the area of contrast of light intensity, second mechanism for scanning an image of the object that is a small portion of the field of view and that is spaced said predetermined distance in back of said focal position and in the same area of contrast of light intensity, means for generating a first electrical signal related to the light received in scanning by said first mechanism, means for generating a second electrical signal related to the light received in scanning by said second mechanism, and means responsive to the difference between said first and second electrical signals for operating said motor means to change a parameter if said imaging system to focus an image of the object at said focal position.

21. The apparatus set forth in claim 20, wherein the portion of the field of view that is scanned is from about 0.5% to about 10% of the total field of view.

22. The apparatus set forth in claim 20, wherein the portion of the field of view that is scanned is disposed substantially centrally thereof.

23. Apparatus for automatically focusing upon an object within a field of view wherein the object has an area of contrast of light intensity thereat, said apparatus comprising an optical imaging system including a local position and a lens assembly for directing an image of the field of view upon the focal position along the optical axis thereof, motor means for changing a parameter of said optical imaging system to change the focusing of the object in the field of view with respect to the focal position, first mechanism for scanning an image of the object spaced a predetermined distance in front of said focal position and in the area of contrast of light intensity, second mechanism for scanning the image of the object spaced said predetermined distance in back of said focal position and in the same area of contrast of light intensity, means for generating a first electrical signal modulated in accordance with the intensity of light received in scanning by said first mechanism, means for generating a second electrical signal modulated in accordance with the intensity of light received in scanning by said second mechanism, means for detecting the modulation on said first and second electrical signals, and means responsive to the difference between the modulation on said first and second electrical signals for operating said motor means to change a parameter of said optical imaging system to focus an image of the object at said focal position.

24. The camera set forth in claim 6, wherein said motor means moves said lens assembly toward and away from said film holder to focus an image of the object at said focal position.

25. A camera for automatically focusing upon an object in a field of view wherein the object has an area of contrast of light intensity thereat, said camera comprising a frame having a film holder mounted thereon at a focal position and a lens assembly mounted therein for directing an image of the field of view upon the focal position along the optical axis thereof, motor means for moving said film holder and said lens assembly toward and away from each other to change the focusing of the object in the field of view with respect to the focusing position, first mechanism mounted on said frame adjacent to said film holder for scanning an image of the object that is a small portion of the field of view and that is spaced a predetermined distance in front of said focal position along a predetermined path in the area of contrast of light intensity, second mechanism mounted on said frame adjacent to said film holder for scanning the image of the object that is a small portion of the field of view and that is spaced a predetermined distance in back of said focal position along the same path in the same area of contrast of light intensity, means mounted on said frame for generating a first electrical signal related to the light received in the scanning by said first mechanism, means mounted on said frame for generating a second electrical signal related to the light received in scanning by said second mechanism, and means responsive to the difference between said first and second electrical signals for operating said motor means to move said film holder and said lens assembly toward and away to each other to focus an image of the object at said focal position upon said film holder.

26. The camera set forth in claim 25, wherein the portion of the field of view that is scanned is disposed substantially centrally thereof and is from about 0.5% to about 10% of the total field of view.

27. A camera for automatically focusing upon an object in a field of view wherein the object has an area of contrast of light intensity thereat, said camera comprising a frame having a film holder mounted thereon at a focal position and a lens assembly mounted thereon for directing an image of the field of view upon the focal position along the optical axis thereof, motor means for moving said film holder and said lens assembly toward and away from each other to change the focusing of the object in the field of view with respect to the focal position, first mechanism mounted on said frame adjacent to said film holder for scanning an image of the object spaced a predetermined distance in front of said focal position along a predetermined path in the area of contrast of light intensity, second mechanism mounted on said frame adjacent to said film holder for scanning an image of the object spaced said predetermined distance in back of said focal position and along the same path in the same area of contrast of light intensity, means mounted on said frame for generating a first electrical signal modulated in accordance with the intensity of light received in scanning by said first mechanism, means mounted on said frame for generating a second electrical signal modulated in accordance with the intensity of light received in scanning by said second mechanism, means for detecting the modulation on said first and second electrical signals, and means responsive to the difference between the modulation on said first and second electrical signals for operating said motor means to move said film holder and said lens assembly toward and away from each other to focus an image of the object at said focal position upon said film holder.

References Cited

UNITED STATES PATENTS

| | | | |
|---|---|---|---|
| 2,968,994 | 1/1961 | Shurcliff | 88—24 |
| 3,274,913 | 9/1966 | Biedermann | 95—44 |

JOHN M. HORAN, *Primary Examiner.*